US009980179B2

(12) United States Patent
Coffman

(10) Patent No.: US 9,980,179 B2
(45) Date of Patent: May 22, 2018

(54) MANAGING COMPUTATIONAL RESOURCES IN A NETWORK ENVIRONMENT

(71) Applicant: CISCO TECHNOLOGY, INC., San Jose, CA (US)

(72) Inventor: James E. Coffman, Boulder, CO (US)

(73) Assignee: Cisco Technology, Inc., San Jose, CA (US)

( * ) Notice: Subject to any disclaimer, the term of this patent is extended or adjusted under 35 U.S.C. 154(b) by 321 days.

(21) Appl. No.: 14/713,749

(22) Filed: May 15, 2015

(65) Prior Publication Data
US 2015/0334716 A1 Nov. 19, 2015

Related U.S. Application Data

(60) Provisional application No. 61/993,517, filed on May 15, 2014.

(51) Int. Cl.
*H04L 12/26* (2006.01)
*H04W 28/20* (2009.01)
(Continued)

(52) U.S. Cl.
CPC ......... *H04W 28/20* (2013.01); *H04L 12/6418* (2013.01); *H04L 45/02* (2013.01);
(Continued)

(58) Field of Classification Search
CPC ..... H04W 28/20; H04L 12/6418; H04L 45/02
(Continued)

(56) References Cited

U.S. PATENT DOCUMENTS 7,657,628 B1 * 2/2010 McDysan ........... G06F 11/2028
370/401
7,852,748 B2 * 12/2010 Le Faucheur ........... H04L 45/22
370/217

(Continued)

FOREIGN PATENT DOCUMENTS

WO WO2013/104735 7/2013

OTHER PUBLICATIONS

Slattery, "Handling Video in an SDN World," Apr. 24, 2013, 3 pages; http://www.nojitter.com/post/240153572/handling-video-in-an-sdn-world.

*Primary Examiner* — Christopher R Crompton

(57) ABSTRACT

The present disclosure describes approaches for managing computational resources in a network environment. A computational resource may include any resource consumable over a network and available in finite supply. One example is a method comprising receiving a request associated with initiating a communication session in a network. The request may identify a source endpoint and a destination endpoint of the communication session and a value of a computational resource associated with the communication session. A measure of the computational resource may be determined for at least one network element in a path from the source endpoint to the destination endpoint. At least one rule may be applied to determine whether to allow the communication session to be initiated at the value. The at least one rule may identify alternative values for the computational resource. An instruction to initiate the communication session is generated based on the at least one rule.

21 Claims, 4 Drawing Sheets

(51) Int. Cl.
*H04W 72/04* (2009.01)
*H04L 12/751* (2013.01)
*H04W 72/10* (2009.01)
*H04W 40/04* (2009.01)
*H04W 76/00* (2018.01)
*H04L 12/64* (2006.01)
*H04L 12/725* (2013.01)
*H04L 12/853* (2013.01)
*H04L 12/851* (2013.01)

(52) U.S. Cl.
CPC ........ *H04L 45/302* (2013.01); *H04L 47/2416* (2013.01); *H04L 47/2441* (2013.01); *H04W 40/04* (2013.01); *H04W 72/0486* (2013.01); *H04W 72/10* (2013.01); *H04W 76/00* (2013.01)

(58) Field of Classification Search
USPC .......................................................... 370/237
See application file for complete search history.

(56) References Cited

U.S. PATENT DOCUMENTS

| | | | |
|---|---|---|---|
| 2008/0273591 A1 | 11/2008 | Brooks et al. | |
| 2010/0098233 A1* | 4/2010 | Mang | H04M 3/42187 379/208.01 |
| 2012/0027024 A1* | 2/2012 | Liang | H04L 12/4641 370/412 |
| 2012/0269053 A1* | 10/2012 | Yu | H04L 12/4641 370/216 |
| 2014/0362686 A1* | 12/2014 | Jogalekar | H04L 47/12 370/229 |

* cited by examiner

MANAGING COMPUTATIONAL RESOURCES IN A NETWORK ENVIRONMENT

CROSS-REFERENCE TO RELATED APPLICATIONS

This application claims the benefit of priority under 35 U.S.C. § 119(e) to U.S. Provisional Application Ser. No. 61/993,517, entitled "STATISTICAL VIDEO BANDWIDTH MANAGEMENT VIA SDN" filed May 15, 2014, which is hereby incorporated by reference in its entirety.

TECHNICAL FIELD

This disclosure relates in general to the field of communications and, more particularly, to managing computational resources in a network environment.

BACKGROUND

Many client applications generate video streams including multimedia players, Internet browsers, Internet Protocol Television (IPTV) applications, collaboration applications, and the like. Collaboration applications include applications that enable remote users to virtually collaborate with one another (such as CISCO WEBEX, GOOGLE HANGOUTS, MICROSOFT SKYPE, AND CISCO JABBER). As an example of a collaboration application, a virtual meeting application may enable one or more users to conduct a virtual meeting including voice streams, video streams, and/or other streams of data (e.g., documents, text, other media). Managing computational resources (e.g., bandwidth) for data streams produced by such applications can be a challenge for network operators.

A video stream is a stream of video data including packets that are delivered, by network elements, to endpoints in a network. Such video streams can include corresponding audio streams (e.g., audio of a person speaking which corresponds to moving images of the person speaking). One endpoint may be a source of the video stream while another endpoint is a destination of the video stream. A communication session may be established between the source and the destination. The communication session may be utilized to transmit and/or receive the video stream over the network. In some cases, the video stream may be delivered substantially directly from the source endpoint to the destination endpoint (e.g., delivered using network elements in a substantially directly path from the source endpoint to the destination endpoint and/or without the use of a server between the source endpoint to the destination endpoint). In other cases, a server may, at least in part, deliver the video stream from the source endpoint to the destination endpoint (e.g., where the source endpoint transmits the video stream to the server and the server transmits the video stream to the destination endpoint). Video streams can consume large amounts of bandwidth and other computational resources over a network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
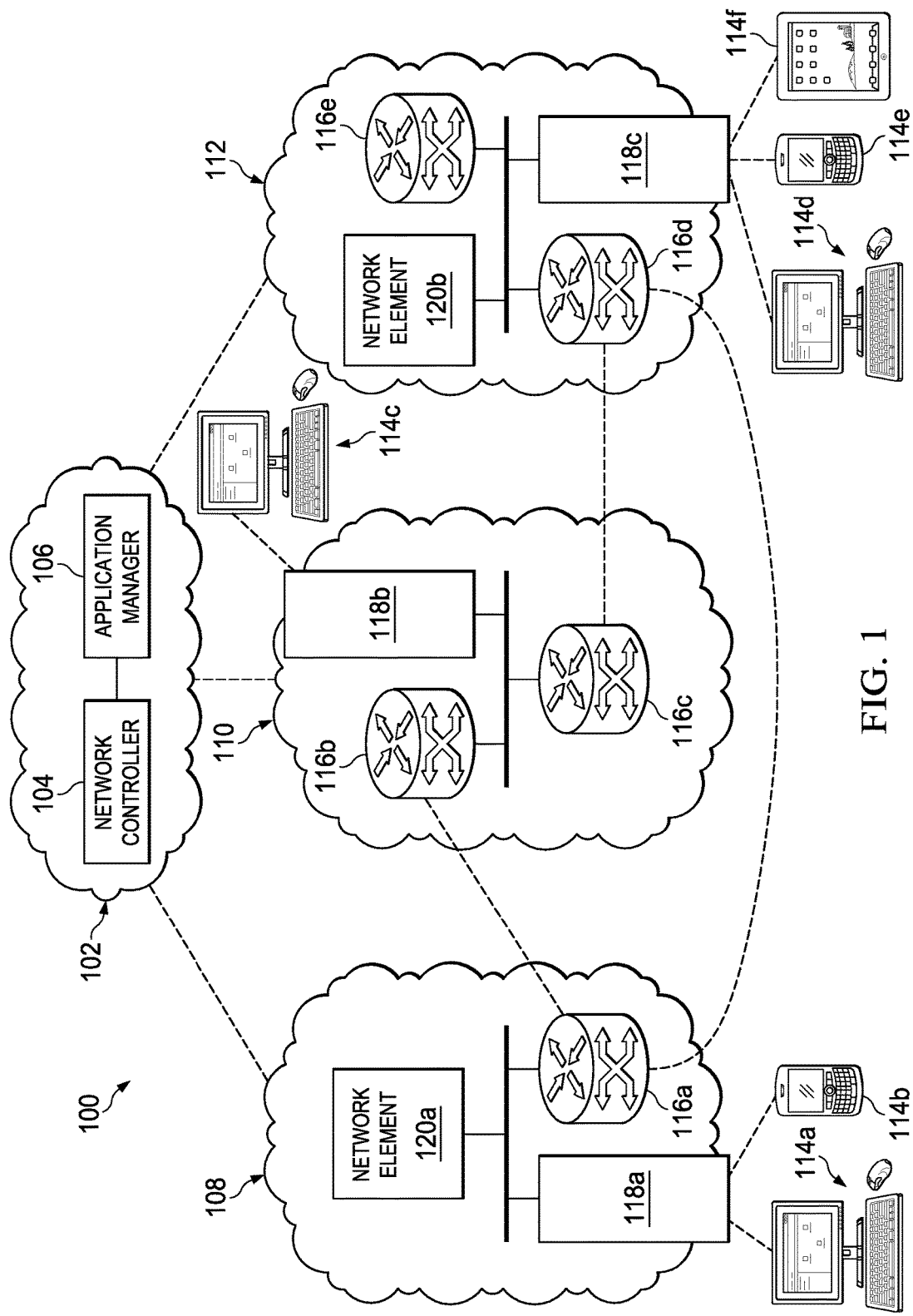
FIG. 1 illustrates a communication system 100 for managing network resources, according to an embodiment of the present disclosure.

Embodiments of the present disclosure include methods, systems, and apparatuses for managing computational resources in a network environment. For example, a method may include receiving a request associated with initiating a communication session in a network. A "communication session" is inclusive of an exchange of information over a connection between two or more endpoints, network elements, or combinations thereof. In operation, the communication session may be utilized to transmit packets from the first endpoint to a second endpoint. As an illustrative (non-limiting) example, such a communication session may include any one or more of a Transmission Control Protocol (TCP) session, an Internet Protocol (IP) session, a Hypertext Transfer Protocol (HTTP) session, a Session Initiation Protocol (SIP) session, a Real-time Transport Protocol (RTP) session, a propriety session protocol, and the like. The request may identify a source endpoint and a destination endpoint of the communication session and a bandwidth value associated with the communication session. The bandwidth value may correspond to a maximum, a minimum, or any other parameter utilized to monitor, control, and/or initiate the communication session. A measure of bandwidth may be determined for at least one network element in a path from the source endpoint to the destination endpoint. The measure of bandwidth may relate to an available bandwidth capacity of one or more network elements in the path, an available bandwidth capacity of a network element that is a bottleneck for data traffic in the network, or any other measure. At least one rule may be applied to determine whether to allow the communication session to be initiated at the bandwidth value. The at least one rule may identify alternative bandwidth values. For example, if the communication session is not allowed to be initiated at the bandwidth value, the bandwidth value may be replaced by one of the alternative bandwidth values prior to initiating the communication session. An instruction to initiate the communication session is generated based on the at least one rule.

While some embodiments relate to the managing bandwidth, the present disclosure is not limited to such embodiments. Indeed, the teachings of the present disclosure are equally applicable to managing any computational resource.

In other embodiments, a method may include receiving a request associated with initiating a communication session in a network. The request may identify a source endpoint and a destination endpoint of the communication session and a value of a computational resource associated with the communication session. A measure of the computational resource may be determined for at least one network element in a path from the source endpoint to the destination endpoint. At least one rule may be applied to determine whether to allow the communication session to be initiated at the value. The at least one rule may identify alternative values for the computational resource. An instruction to initiate the communication session is generated based on the at least one rule.

Example Embodiments

Video streams generated by collaboration applications can be highly variable over time. When a communication session begins, it may transmit a video stream at a maximum value (e.g., bit rate) that is 3 to 5 times higher than during other times in the communication session. Thus, maintaining a minimum quality for a set of video streams in a network can be challenging due to the variability in bandwidth consumption by the video streams over time.

An approach to dealing with this challenge is to limit the amount of video traffic across one or more network links (e.g., limit the amount of video traffic so that it does not exceed the capacity of any one link in a network path, or across the network hops). Some collaboration applications limit the amount of video traffic based on simple estimations. For example, a collaboration application may count the number of communication sessions that are utilizing a link and estimate the amount of bandwidth used by each communication session (e.g., based on a maximum bit rate for video stream transmitted in each session). However, such estimation can result in poor video quality (e.g., if the estimate is too low) or unutilized bandwidth capacity (e.g., if the estimate is too high).

The systems and methods described herein address the above issues (and others) by managing network resource consumption based on actual resource utilization information to determine the resources available for a new communication session. In one example, the systems and methods relate to managing bandwidth using real-time (or near real-time) bandwidth utilization information, received from a network controller in software defined networking (SDN) environment, to determine bandwidth available for a new video session.

Software defined networking (SDN) relates to a number of network elements connected to one another and configured to establish a network. Some network resources may be virtualized based on one or more physical elements, thereby allowing dynamic scaling and allocation of network resources. For example, network elements, such as routers, switches, and load-balancers may be virtualized. In addition, a network controller may act as a central manager for the network and the (physical and/or virtual) network elements therein. In some instances, the network controller may be an SDN controller. In traditional systems, each network element may store information regarding a portion of the network but none may store information regarding the full network. For example, each router may store a routing information base (RIB) and/or a forwarding information base (FIB) and exchange updates with its neighbors in the network. Thus, in such traditional systems, each router may store information identifying only a portion of the topology of the network (i.e., connection topology to its neighbors). In contrast, a network controller (e.g., in a SDN network) can access and control substantially all network elements in the network. The network controller can access information regarding the entire network. In the example of routers, the network controller may retrieve RIB and/or FIB information from a plurality of routers to generate a network topology for the entire network (or topology for a portion of the network that extends beyond that described by FIB/RIB information from a single router). Moreover, the network controller may retrieve information on the operational status of network elements. For example, network controller may poll one or more network elements for current (e.g., real-time) utilization of one or more computational resources. The present disclosure discusses, among other things, systems and methods that utilize capabilities of network controllers to manage computational resources for data streams. Network controllers are described in further detail below.

A computational resource is inclusive of any resource that is consumable over a network and comprises a finite supply. The following are non-limiting examples of a computational resource: bandwidth, processing power (such as CPU cycles), data storage, server farms, capacity in a priority queue (e.g., maximum queue size), queue slots, video transcoding resources, audio noise cancelling resources, any other resource accessible in a network environment, or a group of any one or more of the foregoing.

While other systems may use bandwidth to make decisions regarding video stream, such systems fail to leverage interactions between a network controller and an application manager. Such other systems fail to provide requirements for network elements to actively provide delay and throughput information to network controllers for use by an application (and/or application manager). In addition, these other systems fail to address the variability of network flows (e.g., video traffic) over time and fail to incorporate the real-time (or near real-time), end-to-end network performance into the process for managing the network flows. For example, performance Routing (PfR) is a set of techniques that manages application performance by selecting a path for each application based on criteria such as delay, loss jitter, reachability, etc. Performance routing also offers the ability to load balance and route around traditional network problems such as black holes and brownouts. PfR fails to manage network flows for applications end-to-end and in real-time, as disclosed herein. PfR fails to provide for real-time communication with a collaboration application for managing network resources, as disclose herein.

Turning to FIG. 1, FIG. 1 illustrates a communication system 100 for managing network resources, according to an embodiment of the present disclosure. The communication system 100 includes a network comprising a plurality of sub-networks 102, 108, 110, and 112. Within the context of the disclosure, a 'network' used herein represents a series of points, nodes, endpoints, or network elements interconnected via communication paths. A network offers a communicative interface between sources and/or destinations (hosts), and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium. In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

Each sub-network is a network that is connected to other sub-networks in a larger network. In this example, sub-network 102 is operably coupled to sub-networks 108, 110, and 113; sub-network 110 is operably coupled to sub-networks 108 and 112; and sub-network 108 is operably coupled to sub-network 112. Each sub-network may be located in a same location (e.g., an individual data center) or may be distributed across different locations. For example, each of the sub-networks 102, 108, 110, and 112 may correspond to different data centers. In a particular example, each of the sub-networks 102, 108, 110, and 112 may correspond to a data center in a different city. Sub-network 102 comprises a network controller 104 and an application manger 106. The network controller 104 and the application manger 106 are operably coupled to one another. Sub-network 108 comprises a network access point 118a, a router 116a, and one or more elements 120a. Endpoints 114a and 114b connect to the sub-network 108 (and the larger network of communication system 100) via the access point 118a. Sub-network 110 comprises a network access point 118b, and routers 116b and 116c. Endpoint 114c connects to the sub-network 110 (and the larger network of communication system 100) via the access point 118b. Sub-network 112 comprises a network access point 118c, one or more elements 120b, and routers 116d and 116e. Endpoints 114d, 114e, and 114f connect to the sub-network 112 (and the larger network of communication system 100) via the access point 118c.

Endpoints 114a-f are representative of any type of client device to communicating in communication system 100. Furthermore, endpoints 114a-f can be associated with individuals, clients, customers, or end users. The term 'endpoint' is inclusive of devices used to initiate a communication, such as a computer, a personal digital assistant (PDA), a laptop or electronic notebook, a cellular telephone (e.g., an (PHONE, an IP phone, a BLACKBERRY, a GOOGLE DROID), a tablet (e.g., an IPAD), or any other device, component, element, network element, or object capable of initiating voice, audio, video, media, and/or data exchanges within communication system 100. Endpoints 114a-f may also be inclusive of a suitable interface to the human user, such as a microphone, a display, or a keyboard or other terminal equipment. Endpoints 114a-f may also be any device that seeks to initiate a communication on behalf of another entity or element, such as a program, a conferencing device, a database, or any other component, device, element, or object capable of initiating an exchange within communication system 100. Data, as used herein in this document, refers to any type of numeric, voice, messages, video, media, or script data, or any type of source or object code, or any other suitable information in any appropriate format that may be communicated from one point to another.

As used herein in this Specification, the term 'network element' is meant to encompass any of the aforementioned elements, as well as servers, end user devices, routers, switches, cable boxes, gateways, bridges, load balancers, firewalls, inline service nodes, proxies, processors, modules, network access points, or any other suitable device, component, element, proprietary appliance, or object operable to exchange, receive, and transmit information in a network environment. These network elements may include any suitable hardware, software, components, modules, interfaces, or objects that facilitate the operations thereof. This may be inclusive of appropriate algorithms and communication protocols that allow for the effective exchange of data or information. Any such network element may be a physical device and/or a virtualized from one or more physical devices.

Any of these elements (e.g., the network elements, endpoints, application managers, network controllers, etc.) can include memory elements for storing information to be used in managing bandwidth, as outlined herein. Additionally, each of these elements may include a processor that can execute software or an algorithm to perform the gathering of link utilization information activities as discussed in this Specification. These elements may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

The network controller 104 has global view and control of the network and, therefore, can manage various aspects of the network. The network controller is the "brains" of the network. The network controller 104 is operable to communicate with other network elements in the communication system 100. The network controller may include interfaces for communicating with network infrastructure (e.g., network elements) and other interfaces for communicating with other elements that utilized the global view and control provide by the controller (e.g., applications, business logic). In an SDN environment, the former interface may be referred to as a Southbound Interface and the latter may be referred to as a Northbound Interface. The network controller, itself, may be virtualized based on hardware residing on a plurality of physical devices.

The network controller 104 may retrieve data from and/or transmit data to each element in the network. For example, the network controller 104 may retrieve, from one or more network elements, information regarding utilization of a computational resource. The network controller may share utilization information with other elements in the communication system 100. The utilization information may be used as a basis for determining an amount of one or more computations resources to allocate to a new communication session between a source and a destination. Such information retrieved by network controller 104 may be utilized to determine, in advance of initiating the communication session, whether the communication session should be initiated based on a first amount of a computational resource or an alternate amount of the computational resource. In a particular example, the network controller 104 identifies network elements that may be utilized for a video session requested by a collaboration application (e.g., the network elements are located on a selected path from the source to the destination of the video session), retrieves current bandwidth utilization information for the network elements, and transmits the bandwidth utilization information to an application manger that manages the collaboration application. Thus, the network controller 104 can retrieve actual utilization information for the network elements needed for the requested video session.

The network controller 104 can retrieve information from individual network elements and aggregate such information into a global view of the network. The network controller may retrieve retrieving a plurality of RIBs and/or FIBs from a plurality of network elements in the network (e.g., by periodically querying the network elements for the contents of their RIBs and FIBs). The network controller may generate a topological map of the network based on the plurality of RIBs and/or FIBs. For example, the network controller may generate a topological map of a portion of the network based on each RIB and/or FIB. The different topological maps of the portions of the network may be overlaid on one another (e.g. by matching common elements across different topological maps of the portions of the network) to generate the topological map of the network (e.g., the entire network or portion thereof). The network controller may calculate a path for a communication session by searching the topological map of the network between a source endpoint and a destination endpoint of the communication session. Thus, the network controller uses the topological map to determine the actual network elements (and/or links connecting such elements) that a network flow will utilize when traversing the network. Alternatively, the network controller may calculate the path for the communication session by querying the network elements (e.g., one at a time) from the source endpoint (where the source connects) to the destination endpoint (where the sink connects). Each query may return a next hop, which can be used to identify a next endpoint to query. When the path has been identified between the source endpoint and the destination endpoint, the networked controller may to gather current utilization information for the path.

In other examples, the network controller may instantiate new network elements in the network, retrieve data from existing network elements in the network, implement policies (rules) across the network (e.g., by transmitting, to one or more network elements, instructions corresponding to the policy), retrieve utilization information (e.g., snapshots and/or streams of real-time utilization of computational resources) from one or more network elements, retrieve network topology information (e.g., RIBs and/or FIBs) from one or more network elements, calculate end-to-end paths within the network.

Utilization information (e.g., retrieved by a network controller and/or an application manager) is inclusive of one or more values that identify a current amount of a computational resource being used (unavailable for use), a current amount of the computational resource available for use, a total capacity of the computational resource, a percentage of total capacity of the computational resource, or any combination of the forgoing. Such values may be measured at a single point in time, averaged over a window of time, may correspond to historical averages, or may be generated in any way that represents an availably (or lack thereof) of a computational resource at one or more points in time. In some examples, a network element may computes such values an average over time intervals that are long relative to single packet transmission but short relative to the delays that will interfere with human perceptions of video quality (e.g., on the order of 10 millisecond (ms)). The network element may transmit the utilization information to the network controller on a periodic basis. Alternatively, the network controller may poll the network elements to gather utilization information, as needed. In either case (i.e., polling or periodic update), the network controller can retrieve the utilization information prior to initiating a new communication session for a data stream. The network controller may use the utilization information (e.g., in combination with the previously computed path for communication session) to identify a most congested network element on the path (e.g., the network element with the least available capacity). An application manager may utilize this information (i.e., the utilization information and/or a critical network element) to determine how much bandwidth should be allowed for the communication session. For example, if the capacity available is 500 kilobits per second (kbps) the application controller may request the source endpoint limit its video to a maximum value that is equal to or less than 500 kbps (e.g., 384 kbps).

Note that data transmission rates (e.g., bit rates) for data streams (e.g., video streams) vary over time. In the example of a video stream, when a scene of the video is relatively static (e.g., where each frame of the scene has few changes relative to a last frame), transmission of such a scene may require fewer bits (per unit of time) than for scenes that are dynamic (e.g., where each frame of a scene has many changes relative to the last frame). For example, when a video stream begins (e.g., in a video conferencing application), the scene may be dynamic (e.g., due to a user moving within in the view of their camera, or adjusting a camera). Thus, data transmission rates may be higher during some portions of the video stream relative to other portions of the video stream. Due to this variability, simple rate calculations based on the number of session multiplied by an estimated bandwidth may overestimate the needed bandwidth (e.g., if the assumption is made that a session needs its maximum bandwidth during its whole duration). Similarly, if some lower estimated average is chosen to represent the bandwidth needed by a single session, the quality of all sessions flowing over a link may be adversely affected if this estimate is low. By using actual measurements of utilization information (as disclosed herein), a network operator can improve the efficiency with which network elements are utilized for data flows.

The application manager 106 is operable to manage applications that are deployed in the communication system 100. The application manager 106 may manage applications that execute on any of the endpoints (114a-f) and/or network elements (116a-e, 118a-c, 120a-b). By leveraging the global view of the network available via the network controller, the application manager 106 may identify current utilization information for network elements (and/or links connecting such network elements) on the end-to-end path for a data stream for an application. For example, the application manager may identify a path for a video stream (requested by an application) based on the IP addresses of a source and a destination of the video stream and utilizing knowledge of network paths provided by the network controller. In contrast, in other networks (e.g., that lack such a network controller), the application may only be able to communication with individual switches and/or routers and therefore may not feasibly attain the current utilization information of the end-to-end network links needed for the requested video stream. The application controller reduces the likelihood of congestion issues (e.g., queuing delays or loss due to queue overflow) for packets of new communication sessions by ensuring (before a new communication session is allowed to be initiated) that there is sufficient unused capacity (based on utilization information) for the new communication session. Generally speaking, packet queuing will be limited if each hop in the path between the source and the destination has unused capacity sufficient for the new communication session.

In some examples, the application manager 106 manages the applications by generating parameters used to initiate communication sessions for the applications. For example, the application manager may determine an amount of a computational resource to be allocated to a communication session (e.g., based on utilization information) by leveraging the data available via the network controller. As discussed above, the application manager and/or the application may identify the utilization information on each network element and/or link on the path for a data stream to be generated by an application. The application manager uses the utilization information to determine an amount of a computational resource to be allocated to a communication session. The application manager may receive, from the application, a request for the communication session (e.g., a request for a new video session). The request may identify a source endpoint and a destination endpoint of the communication session as well as identify a value of a computational resource associated with the communication session (e.g., where the value represents a maximum, minimum, or other amount of the computational resource for use in the communication session). The application manager use the utilization information (e.g., actual bandwidth utilization) to determine whether the new video session should be: allowed, as is (e.g., use the value specified in the request; allow the new video session without any modification to the video quality); allowed but with modification (e.g., allow video of lower/higher quality than requested based on current utilization and/or limit/increase the quality of the video to match the computational resources available on the most utilized element and/or link on the path); or not allowed at all (e.g., the video cannot be supported by the most utilized link on the path). In other examples, when the links in the path do not have the requisite bandwidth to support transmission of the new video flow (as requested by an application controller), the application controller may instruct other endpoints that utilize elements/links in the path of the new video session to reduce their use of computational resources to accommodate the new video flow (e.g., instruct the other endpoints to reduce video quality to free up computational resources needed for the new video session).

Each packet (and/or communication session) may belong to a class of service. In general, the different classes of service may correspond to differences in how the packets are treated when being transmitted, by network elements, across the network (e.g., where higher priority traffic receives preferential treatment relative to lower priority traffic). For example, the different classes of service may correspond to the probability of the packet being dropped relative to other packets and/or to latency experienced by the packet. The packets may be marked with a priority value that corresponds to the classes of service. For example, the packets may be marked by setting one or more bits in at least one of a Type of Service (TOS) field in a packet, a class of service (COS) field in a packet, a differentiated service field in a packet (e.g., using differentiated services code points (DSCPs)). The priority values may correspond to any representation of a class of service. In a particular example, the priority values may correspond to drop precedence (e.g., high and low; high, medium, and low; a range of numerical values) where higher drop precedence corresponds to an increased likelihood of a packet being dropped (i.e., lower drop precedencies are assigned to higher classes of service to reduce the probability of the packet being dropped relative to other classes of service). The application manager 106 may generate an instruction to mark packets in a communication session with a priority value (e.g., identifying based on a policy of a network element). In such an example, the priority value may used by the network element to reduce the probability of dropping the packets in the communication session relative to other packets that traverse the network element.

Packets in video streams may be marked with a priority value to distinguish from other types of data (e.g., given a different classes of service relative to other data such a voice or documents). For simplicity, this disclosure describes some examples where the entire capacity of each network element/link is dedicated only to video streams. In other examples, the entire capacity of each network element/link is not dedicated only to video streams. Instead, in the other examples, video streams may be limited to a fraction of the bandwidth of each network element/link within the network (e.g., no more that 30% of the bandwidth of each network element/link may be dedicated to video streams). Video streams are typically assigned to a class of service that provides them with high priority access to the network element/link (i.e., low likelihood of packets being dropped). Each network element/link may have a maximum capacity for traffic with high priority access (e.g., a maximum capacity of 30% or one-third of the bandwidth of the network element/link may be high priority traffic). In cases where high priority traffic exceeds the maximum capacity of the network element/link, the priority traffic may be queued in a priority queue. In general, such limits on classes of service (and/or types of data) may be specified in a policy stored on a network element. Thus, when a communication session is requested, the application manager may utilize a policy of at least one network element (on a path of the communication session) to identify a priority value for the communication session. For example, video streams may be assigned a high priority (e.g., a low drop precedence). The policy for the at least one network element may specify that no more than 50% of the traffic handled by the least one network element should be high priority. However, if the least one network element is currently using most of its total computational resources for lower priority traffic, then the video stream can still receive preferential treatment (even though the least one network element is currently using most of its total computational resources). To receive such treatment, the video stream must be assigned the priority value identified in the policy. Once utilization information is determined and a policy for the video stream is established, the network controller may communicate with network elements (and/or endpoints) so that the video stream can be "conditioned" to obtain the priority determined by the policy. This conditioning could take the form of access to priority queues or other resources such as real-time processing, cached memory, etc. In other examples, the conditional may relate to modifying, by the network controller, local policies on the network elements and/or endpoints to ensure that packets belonging to the video stream receive preferential treatment relative to other packets (e.g., where the other packets that have a different class of service).

Only for the sake of clarity, some embodiments of the present disclosure are described in the context of managing bandwidth as an example of a computational resource. However, other computational resources may be managed using the systems and methods disclosed herein without departing from the scope of the present disclosure. For example, system resources may include queue slots, video transcoding resources, audio noise cancelling resources, etc.

Figure 2:
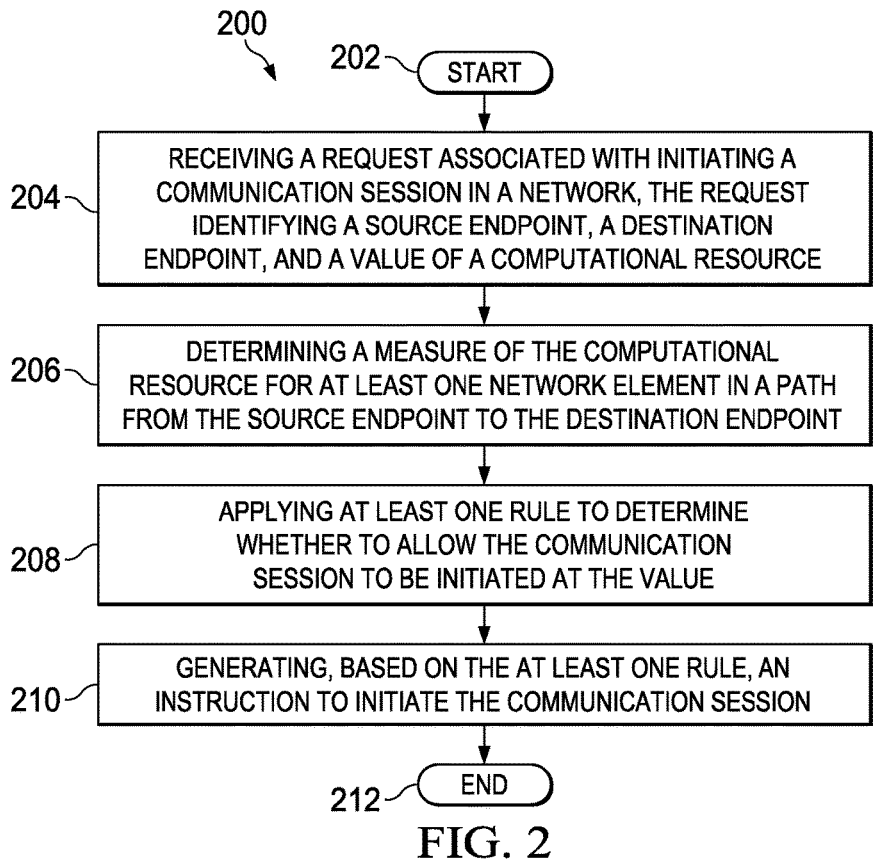
FIG. 2 illustrates logic for managing computational resources, according to some embodiment of the present disclosure.

Turning to FIG. 2, FIG. 2 illustrates logic (200) for managing computational resources, according to some embodiment of the present disclosure. Logic 200 begins at 202, which may coincide with a start/end point of other logic, routines, and/or applications. Logic 200 advances from 202 to 204.

At 204, a request associated with initiating a communication session in a network is received. The request may identify a source endpoint and a destination endpoint of the communication session and a value of a computational resource associated with the communication session. The request may be received from an endpoint executing an application, wherein the application requires the communication session for transmission of a data stream. The value of the computational resource associated may correspond to an amount of the computational resource that is required to initiate the communication session. For example, some communication sessions used for video streams are initiated with a parameter that specifies the maximum bit rate that will be transmitted over the communication session. The value may identify such a parameter or any other detectable parameter that can be used to define (and/or initiate) the communication session.

At 206, a measure of the computational resource is determined for at least one network element in a path from the source endpoint to the destination endpoint. In some examples, a network controller may calculate a path from the source endpoint to the destination endpoint of the communication session. Utilization information may be retrieved from one or more network elements along the patch by a network controller. The utilization information may contain the measure of the computational resource such as an amount of the computational resource that is available for use. In some examples, the measure may be determined from a network element that is a bottleneck in the path. For example, the network element may retrieve current measures of bandwidth from one or more network elements located along the path from the source endpoint to the destination endpoint. The lowest of the current measures of bandwidth (e.g., a bottleneck) may be selected as the measure of bandwidth for the at least one network element. Alternatively, the measure may be determined from an average of more than one network element along the path. In effect, the measure of the computational resource may be a threshold value that is measured (in real-time) and used to determine whether the communication session should be allowed.

At 208, at least one rule is applied to determine whether to allow the communication session to be initiated at the value. The at least one rule may identify alternative values for the computational resource. The rule may also include instructions to compare the value of the computational resource (e.g., the amount needed to initiate the communication session) to the measure of the computational resource (e.g., the threshold value).

At 210, an instruction to initiate the communication session is generated based on the at least one rule. For example, when it is determined to allow the communication session to be initiated at the value, the source endpoint may be instructed to initiate the communication session based on the value. Alternatively, when it is determined to not allow the communication session to be initiated at the value, the source endpoint may be instructed to initiate the communication session based on one of the alternative bandwidth values (identified in the at least one rule). In the case where the source endpoint is attempting to initiate sessions with multiple destinations, the application manager may: check on resource availability between the source and each of the multiple destinations and/or wait until a determination of resource availability has been made for one of the endpoints and then advise the remaining destination endpoints of the determination (e.g., so that the remaining destination endpoints attempt to match the resource availability of the one of the endpoints).

Logic 200 ends at 212, which may coincide with a start/end point of other logic, routines, and/or applications.

Figure 3:
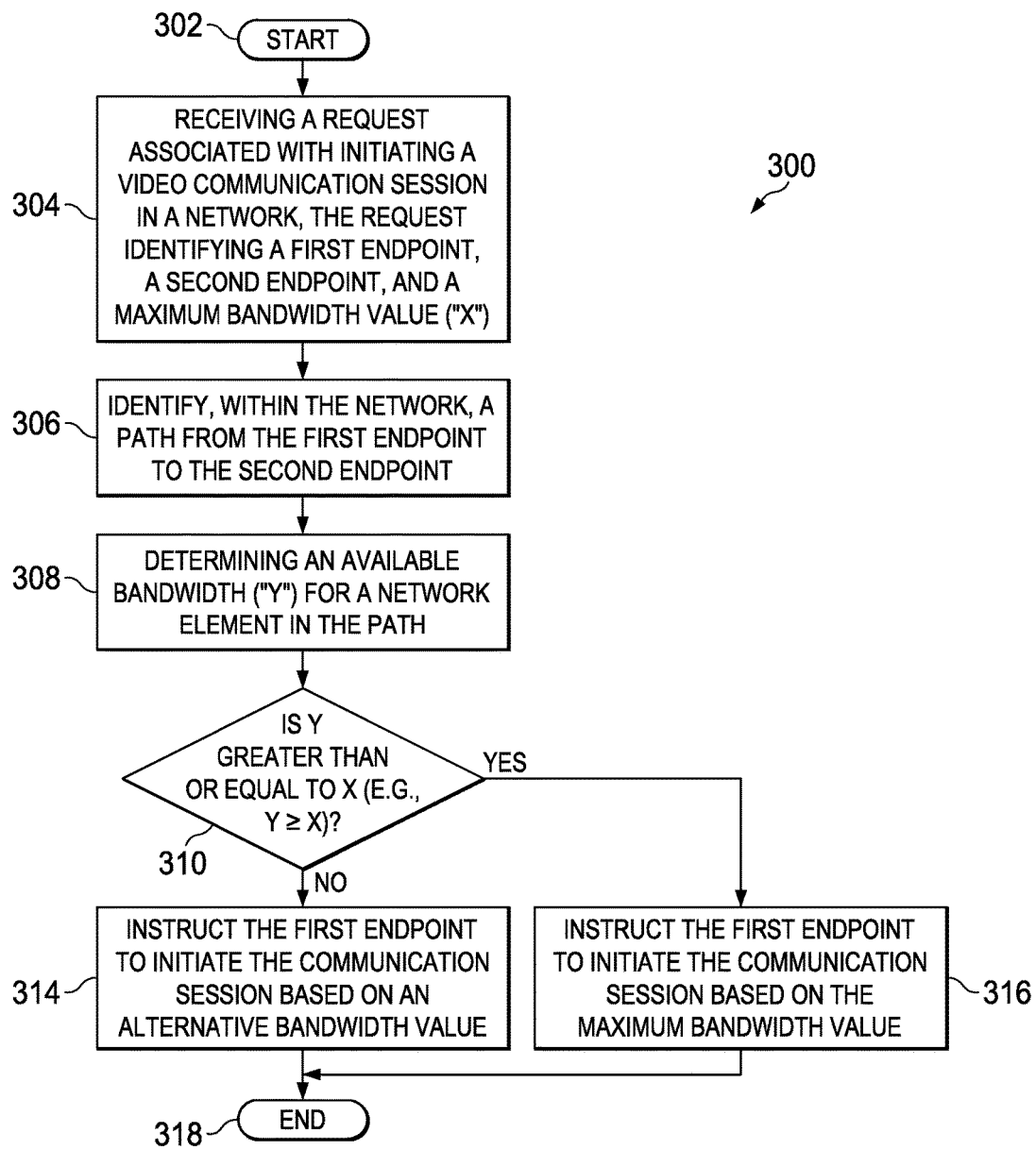
FIG. 3 illustrates an exemplary implementation of the logic of FIG. 2, according to some embodiment of the present disclosure.

Turning to FIG. 3, FIG. 3 illustrates logic (300), which is an exemplary implementation of the logic of FIG. 2, according to some embodiment of the present disclosure. In particular, the example of FIG. 3 relates to an embodiment where bandwidth is the computational resource being managed by the logic. Logic 300 begins at 302, which may coincide with a start/end point of other logic, routines, and/or applications. Logic 300 advances from 302 to 304.

At 304, a request associated with initiating a communication session in a network is received. The request may identify a first endpoint and a second endpoint of the communication session and a maximum bandwidth value (X) associated with the communication session. In some examples, the first endpoint is the source (e.g., the endpoint attempting to initiate and transmit a data stream over the session) and the second endpoint is the destination of the communication session (e.g., the endpoint that is to receive the transmission over the session). The maximum bandwidth value may represent the maximum bit rate to be transmitted over the communication session (i.e., if the session is later initiated). In other examples, a bandwidth value may correspond to a maximum, a minimum, or any other parameter utilized to monitor, control, and/or initiate the communication session. 304 (FIG. 3) is an exemplary implementation of 204 (FIG. 2) and, therefore, can include features similar to those described with respect to 204 (FIG. 2).

At 306, a path, within the network, is identified from the first endpoint to the second endpoint. A network controller may be utilized, at least in part, to identify the path. For example, the network controller may generate a topological map of the network based on based on information retrieved from network elements in the network.

At 308, an available bandwidth (Y) is determined from a network element in the path. The network controller can retrieve the current utilization information from one or more network elements along the path to identify the available bandwidth. The available bandwidth may be determined for at least one network element in a path from the source endpoint to the destination endpoint. The measure of bandwidth may relate to an available bandwidth capacity of one or more network elements in the path, an available bandwidth capacity of a network element that is a bottleneck for data traffic in the network, or any other measure. 308 (FIG. 3) is an exemplary implementation of 206 (FIG. 2) and, therefore, can include features similar to those described with respect to 206 (FIG. 2).

At 310, a rule is applied to determine whether the available bandwidth (Y) is greater than or equal to the maximum bandwidth value (X). If Y is greater than or equal to X (i.e., the capacity of the path is sufficient to support the maximum bandwidth value for the communication session), the logic 300 advances to 316. At 316, the first endpoint is instructed to initiate the communication session based on the maximum bandwidth value. If Y less than X (i.e., the capacity of the path is not sufficient to support the maximum bandwidth value for the communication session), the logic advances to 314. At 314, the first endpoint is instructed to initiate the communication session based on and alternate bandwidth value. After making the determination of which bandwidth value is utilized to initiate the communication session, the logic 300 ends at 318. 318 may coincide with a start/end point of other logic, routines, and/or applications. It is noted that 314 and 316 (FIG. 3) correspond to an exemplary implementation of 210 (FIG. 2) and, therefore, can include features similar to those described with respect to 210 (FIG. 2).

As an illustration of operations associated with logic 300, the following example will be described making simultaneous reference to the components of communication system 100 (FIG. 1) and logic 300 (FIG. 3). A user of endpoint 114c wishes to establish a communication session (for a video conference) with endpoint 114f and may provide input correspond to the same. When the input is received, the endpoint 114c transmits to the application manager 106 a request to establish the communication session with endpoint 114f; the request identifies that the communication session requires a maximum of X bps. The application manager 106 receives the request (i.e., at 304). The application manager mediates signals transmitted between endpoints 114c and 114f. The application manager transmits a request for a video quality service requiring a maximum of X bps to the network controller. The application manager requests, from the network controller 104, a path for the communication session between endpoints 114c and 114f and/or an available bandwidth along the path between endpoints 114c and 114f. The network controller 104 transmits, to the application manager, the path (e.g., at 306) and/or a value of Y bps (e.g., at 308), where Y represents the available bandwidth along the path between endpoints 114c and 114f. In this example, the value of Y bps may represent the bandwidth available on the most resource-limited element within the path between endpoints 114c and 114f. In other words, the value returned (in the case Y bps) by the network control may represent Y bps bandwidth of the element for which all other elements on the path have bandwidth with greater or equal to the returned bandwidth (e.g., the returned bandwidth is a bottleneck or a point of traffic congestion on the network). In this example, the path for the flow may be routed through sub-network 108. As a further example, the link between router 116a (in sub-network 108) and router 116b (in sub-network 110) may have an available capacity of 100 kbps, while the link between router 116a (in sub-network 108) and router 116d (in sub-network 112) has an available capacity of 500 kbps. In this case, the network controller would transmit to the application manager a value of 100 kbps, since the link between router 116a (in sub-network 108) and router 116b (in sub-network 110) represents a point of congestion relative to the link between sub-network 108 and sub-network 110.

A rule may be used to compare Y to X (e.g., at 310). In addition, the rule may specify alternative bandwidth values. If Y>=X (there is enough available bandwidth to handle the maximum) then the application manager instructs the endpoints to initiate the session using X bps as a maximum (e.g., at 310 and 316). If Y<X (there is not enough available bandwidth to handle the maximum), the application manager instructs the endpoints to initiate the session based on an alternative bandwidth value (e.g., at 310 and 314). The rule may include a table of alternative values (e.g., see Sample Table below), which specifies for each video quality service the maximum bandwidth required:

| Sample Table | |
|---|---|
| Service | Maximum bandwidth in megabits per second (mbps) |
| HD 60 fps | 4 mbps |
| HD 30 fps | 3 mbps |
| SD 30 fps | 1.5 mbps |
| . . . | . . . |

Note that in the above sample table, quality increases in when the table read from bottom to top).

The application manager may use the table to choose an alternative value. The alternative value may be the highest quality service that has a maximum bandwidth requirement (in this case bit rate) less than Y, which, therefore, lowers the video rate for the session. The application manager informs the endpoints that the session can be initiated at the alternative value (e.g., the lower bit rate).

Figure 4:
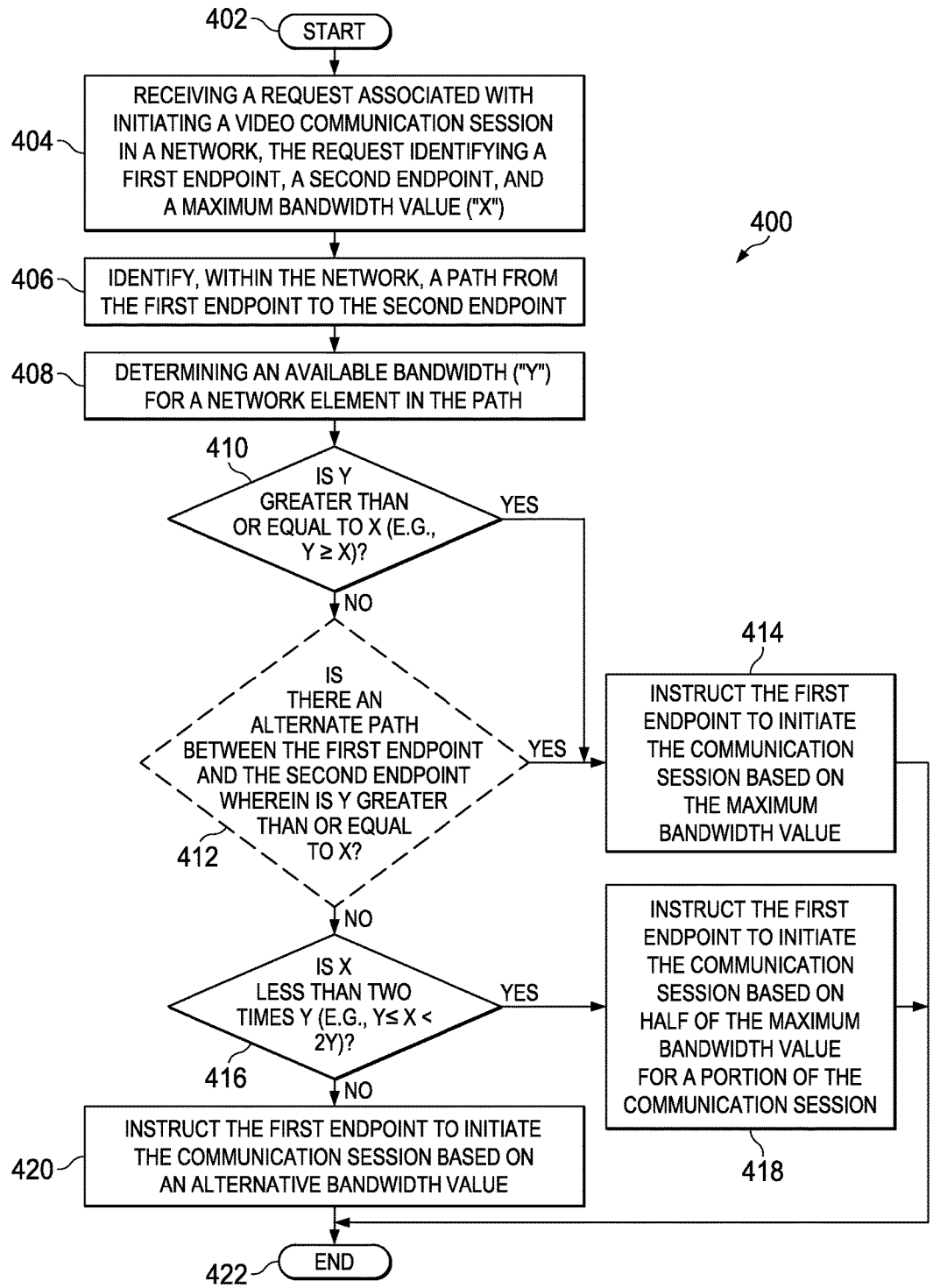
FIG. 4 illustrates another exemplary implementation of the logic of FIG. 2, according to some embodiment of the present disclosure.

Turning to FIG. 4, FIG. 4 illustrates logic (400), which is another exemplary implementation of the logic of FIG. 2, according to some embodiment of the present disclosure. In particular, the example of FIG. 4 relates to an embodiment where bandwidth is the computational resource being managed by the logic. Logic 400 begins at 402, which may coincide with a start/end point of other logic, routines, and/or applications. Logic 400 advances from 402 to 404. It is noted that 404, 406, 408, and 410 correspond to 304, 306, 308, and 310 (respectively) and, therefore, can include features similar to those described with respect to 304, 306, 308, or 310. Some of those features are not repeated here only for the purpose of brevity.

At 410, a rule is applied to determine whether the available bandwidth (Y) is greater than or equal to the maximum bandwidth value (X). If Y is greater than or equal to X (i.e., the capacity of the path is sufficient to support the maximum bandwidth value for the communication session), the logic 400 advances to 414. When advancing from 410 to 414, the first endpoint is instructed to initiate the communication session based on the maximum bandwidth value (e.g., using the path determined at 406).

In some embodiments, if Y less than X (i.e., the capacity of the path is not sufficient to support the maximum bandwidth value for the communication session), the logic advances to from 410 to 412. At 412, it is determined whether there is an alternate path between the first in point in the second in point where Y is greater than or equal to X. In other words, when it is determined to not allow the communication session to be initiated at the bandwidth value (e.g., due to insufficient bandwidth), the alternate path for the communication session is calculated (e.g., by a network controller). In particular, the network controller identifies an alternate path that includes sufficient bandwidth for initiating the communication session at the bandwidth value. Identifying the alternate path may comprise calculating a plurality of alternate paths and selecting one that has an available bandwidth value greater than or equal to maximum bandwidth value for the communication session. If the network controller is able to identify such an alternate path, logic 400 advances to 414. When advancing from 412 to 414, the first endpoint is instructed to initiate the communication session (e.g., based on the maximum bandwidth value) over the alternate path. If the network controller is not able to identify such an alternate path, logic 400 advances to 416.

In other embodiments, if Y less than X (i.e., the capacity of the path is not sufficient to support the maximum bandwidth value for the communication session), the logic advances from 410 to 416 (e.g., and skips 412).

At 416, the rule may be applied to determine whether the maximum bandwidth value (X) is less than two times the available bandwidth (Y). Since logic 400 has already determined that Y<X (e.g., at 410), procedure 416, in effect, confirms that Y<X<2Y.

When it is determined (at 416) that the maximum bandwidth value (X) is less than two times the available bandwidth (Y), logic 400 advances to 418. At 418, the first endpoint is instructed to initiate the communication session based on half of the maximum bandwidth value (X). Such an instruction may correspond to heuristic that estimates that the average bandwidth transmitted over the communication session may be less than the maximum bandwidth value (e.g., average bandwidth may be approximately half of the maximum bandwidth value). Thus, the heuristic is used to estimate the average bandwidth. The communication session is allowed to be initialized using the maximum value based on the heuristic (i.e., even though it exceeds the available bandwidth).

When it is determined (at 416) that the maximum bandwidth value (X) is greater than or equal to two times the available bandwidth (Y), logic 400 advances to 420. At 420, the first endpoint is instructed to initiate the communication session based on an alternate bandwidth value. 420 (FIG. 4) corresponds to 314 (FIG. 3) and, therefore, can include features similar to those described with respect to 314 (FIG. 3). Logic 400 ends at 422, which may coincide with a start/end point of other logic, routines, and/or applications.

As an illustration of operations associated with logic 400, the following example will be described making simultaneous reference to the components of communication system 100 (FIG. 1) and logic 400 (FIG. 4). A user of endpoint 114c wishes to establish a communication session (for a video conference) with endpoint 114f and may provide input correspond to the same. When the input is received, the endpoint 114c transmits to the application manager 106 a request to establish the communication session with endpoint 114f; the request identifies that the communication session requires a maximum of X bps. The application manager 106 receives the request (i.e., at 404). The application manager mediates signals transmitted between endpoints 114c and 114f. The application manager transmits a request for a video quality service requiring a maximum of X bps to the network controller. The application manager requests, from the network controller 104, a path for the communication session between endpoints 114c and 114f and/or an available bandwidth along the path between endpoints 114c and 114f. The network controller 104 transmits, to the application manager, the path (e.g., at 406) and/or a value of Y bps (e.g., at 408), where Y represents the available bandwidth along the path between endpoints 114c and 114f. In this example, the value of Y bps may represent the bandwidth available on the most resource-limited element within the path between endpoints 114c and 114f. In other words, the value returned (in the case Y bps) by the network control may represent Y bps bandwidth of the element for which all other element on the path have bandwidth with greater or equal to the returned bandwidth (e.g., the returned bandwidth is a bottleneck or a point of traffic congestion on the network).

A rule may be used to compare Y to X (e.g., at 410, 412, and/or 416). In addition, the rule may specify alternative bandwidth values. If Y>X (there is enough available bandwidth to handle the maximum) as determined at 410), then the application manager instructs the endpoints to set up the session using X bps as a maximum bandwidth (e.g., at 414). If Y<X (there is not enough bandwidth to handle the maximum) (as determined at 410), then the application manager may request, from the network controller, an alternate path from endpoint 114c to endpoint 114f that avoids the bottleneck but has an available bandwidth of X and/or Y (e.g., at 412). If the network controller responds that such an alternate path exists, then the application manager asks the endpoints to use the alternate path (e.g., at 414). The network controller may also instruct the relevant routers to use the alternate path (e.g., by updating RIBs and/or FIBs in the routers to 'condition' the session). The application manager instructs the endpoints to start the session with maximum bandwidth of X. If there is no such alternate path, then the application manager may advance to determine whether Y<X<2Y (e.g., at 416).

If Y<X<2Y (the requested maximum bandwidth is less than 2 times the amount available and exceeds the available bandwidth) (e.g., as determined at 416 when 412 is skipped or as determined at 416 when 412 is executed and not skipped), then the application manager tells the endpoints to proceed but instructs endpoint 114c to send its initial video information at half the usual rate (and hence over twice the usual time) (e.g., at 418). Thus 114f will see the full picture from 114c appear over (for example) 4 seconds rather than 2. After this initial starting sequence (which may be specified in a number of seconds), 114c will send video data to 114f at a maximum rate of X. This scheme depends on the fact that, in general, endpoints (such as endpoint 114c) will seldom send at the maximum rate of X. If it does indeed need to send video data at the maximum rate, video impairments may be visible to a user of endpoint 114f. However, network operators of the video service may deem this an acceptable trade off for more efficient use of the bandwidth.

If X>2Y (the requested maximum bandwidth exceeds the available bandwidth by more than 2 times) (e.g., as determined at 416), the application manager instructs the endpoints to initiate the session based on an alternative bandwidth value (e.g., at 420). As discussed above the application manager may consult a table (e.g., see Sample Table above and corresponding description) to determine the alternate value.

The systems and methods described herein improve utilization of WAN links for video streams while avoiding quality problems resulting from over use of limited computational resources. The systems and methods described herein eliminate the need for administration of a network topology description into an application (e.g., such as a collaboration application). Instead, a network controller provides topology information to the application, wherein the network controller specifies where, in a path traversed by the video stream, a computational resource is limited. This advantageously eliminates complex and error prone duplication of network topology information into various applications. Other advantages include improving utilization of WAN links for video streams while avoiding quality problems resulting from over use of limited capacity and eliminating the need for administration of a network topology description into the application. In the context of financial trading, increased bandwidth may be strategically allocated to more profitable trading sessions managed by a financial application. Moreover, dynamic changes in network link capacity (due to facilities failures for example) are reflected in the bandwidth availability information presented to the applications, using the approach described herein. Thus, the application can automatically adjust the bandwidth it requests of the network (e.g., based on the real-time availability of network resources).

Logic 200, 300, and/or 400 may be implemented in any component or combination of components of the communication system 100. For example, a processor operatively coupled to (or within) the application manager 106 may execute the logic. As another example, a processor operatively coupled to (or within) the network controller 104 may execute the logic. In further examples, the logic may be provisioned in whole or in part in a component that is a combination the application manager 106 and the network controller 104. In other examples, the logic may be provisioned in whole or in part in any one or more of the network elements (116a-e, 118a-c, 120a-b, 106).

Figure 5:
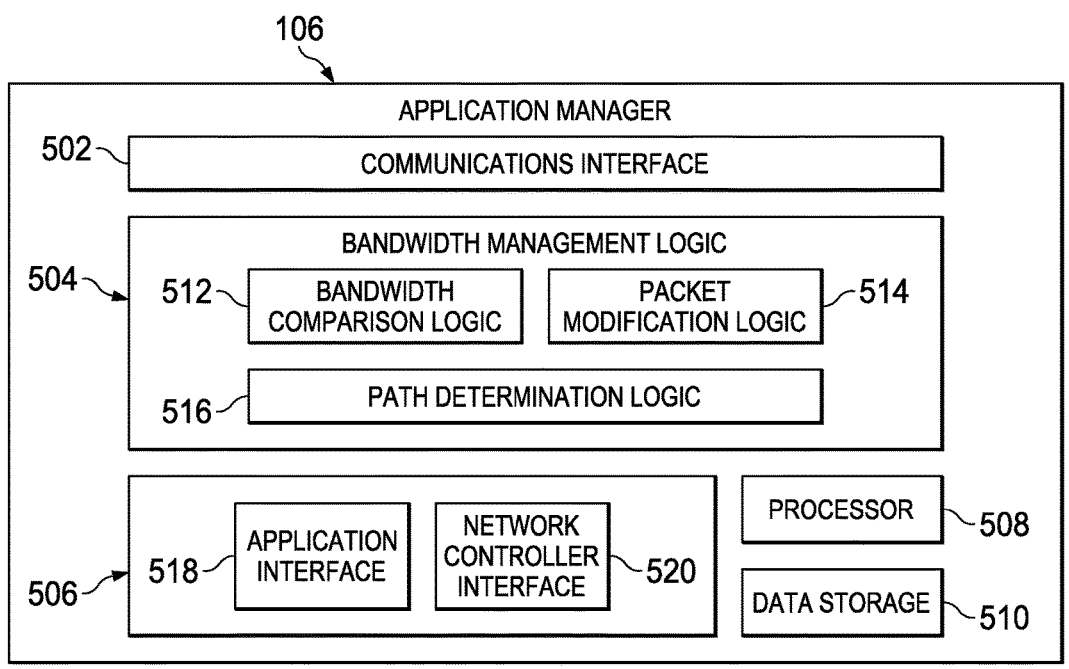
FIG. 5 is an application manager according to some embodiments of the present disclosure.

FIG. 5 is an application manager 106 according to some embodiments of the present disclosure. The application manager 106 includes a computer system to facilitate performance of its operations. In particular embodiments, the computer system may include a processor 508, memory 506, data storage 510, one or more communication interfaces 502, and bandwidth management logic 504. These components may work together in order to provide functionality described herein. In a particular implementation, the application manager may be a CISCO Unified Communications Manager (CUCM).

The one or more communication interfaces 502 may be used for the communication of data between endpoints (114a-f), network elements (116a-e, 118a-c, 120a-b, 106), and/or one or more networks (e.g., 102, 108, 110, and/or 112). For example, communication interface 202 may be used to send and receive data packets for a communication session.

The bandwidth management logic 504 comprises bandwidth comparison logic 512, packet modification logic 514, and path determination logic 516. The bandwidth comparison logic 512 may be utilized to compare available bandwidth with a maximum bandwidth value (e.g., as request for initiating a communication session). The bandwidth comparison logic 512 may store (e.g., in the data store 510) rules, tables of alternative values, and other data utilized to make such comparison and to take action based on the comparison. The packet modification logic 514 may be used to generate instructions to initiate a communication session (based on one or more values of a computation resource). For example, the packet modification logic may be used to condition a particular data stream (e.g., by modifying packets and or by modifying policies associated with network elements in the network to increase the likelihood that a packet receives priority treatment commiserate with a class of service associated with the packet). The path determination logic 516 may be utilized to process data received from a network controller (e.g., data including a path associated with a communication session and/or utilization information for the path). The bandwidth management logic 504 may comprise the logic of any one or more of logic 200, 300, and/or 400 or portion thereof.

The memory 506 includes interfaces 518 and 520. Application interface 518 may be an application programming interface (API) for communicating with applications deployed in network (e.g., receiving a requests from the applications, replying to the applications, transmit instructions the applications, and the like). The network controller interface 520 may be an API (e.g., a northbound API of an SDN controller) utilized to communicate with a network controller.

Processor 508 may be a microprocessor, controller, or any other suitable computing device, resource, or combination of hardware, stored software and/or encoded logic operable to provide, either alone or in conjunction with other components of application manager 106. In some embodiments, application manager 106 may utilize multiple processors to perform the functions (e.g., logic) described herein.

The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Memory 506 and/or data storage 510 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 506 and/or data storage 510 may store any suitable data or information utilized by application manager 106, including software embedded in a computer readable medium, and/or encoded logic incorporated in hardware or otherwise stored (e.g., firmware). Memory 506 and/or data storage 510 may also store the results and/or intermediate results of the various calculations and determinations performed by processor 508.

In one implementation, application managers, network controllers, routers, switches, and/or endpoints described herein may include software to achieve (or to foster) the functions discussed herein for managing resource consumption using knowledge of actual utilization information received from a network controller where the software is executed on one or more processors to carry out the functions. This could include the implementation of instances of routing modules, APIs exposed by a network controller and/or any other suitable element that would foster the activities discussed herein. Additionally, each of these elements can have an internal structure (e.g., a processor, a memory element, etc.) to facilitate some of the operations described herein. In other embodiments, these functions for managing computational resources may be executed externally to these elements, or included in some other network element to achieve the intended functionality. Alternatively, application managers and/or network controllers may include software (or reciprocating software) that can coordinate with other network elements in order to manage network resources, control applications, or access network data via an SDN component, as described herein. In still other embodiments, one or several devices may include any suitable algorithms, hardware, software, components, modules, interfaces, or objects that facilitate the operations thereof.

In certain example implementations, the functions for managing computational resources via network controllers and/or application managers as outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases (tables) such as mapping databases to managing computational resources disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of using data from a network controller and/or application manager to manage resource consumption, as potentially applied to a myriad of other architectures.

It is also important to note that the steps described in the examples illustrate only some of the possible scenarios that may be executed by, or within, the application managers, network controllers, routers, switches, and/or endpoints described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the application managers and network controllers in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving a request associated with initiating a communication session in a network, the request identifying a source endpoint and a destination endpoint of the communication session and a value of a computational resource associated with the communication session;
determining a measure of the computational resource for at least one network element in a path from the source endpoint to the destination endpoint;
applying at least one rule to determine whether to allow the communication session to be initiated at the value, wherein the at least one rule identifies values;
identifying a priority value for the communication session based on a policy of the at least one network element;
marking packets in the communication session with the priority value retrieved from the policy of the at least one network element, the priority value being used by the at least one network element to reduce the probability of dropping the packets in the communication session relative to other packets that traverse the at least one network element;
generating, based on the at least one rule, an instruction to initiate the communication session;
during the communication session, the method further comprising:
determining the measure of the computational resource for each of a plurality of different classes of service for the at least one network element, the classes of service comprising a first priority value and a second priority value, wherein packets marked with the first priority value have a lower likelihood of being dropped by the at least one network element than packets marked with the second priority value;
determining that the at least one network element is using a majority of its capacity for the packets marked with the second priority value;
determining, from the policy of the at least one network element, that there is additional available capacity on the at least one network element for the packets marked with the first priority value; and
conditioning the packets in the communication session by identifying the priority value of the packets to be the first priority value so that the at least one network element uses at least a portion of the additional available capacity for the packets in the communication session.

2. The method of claim 1, wherein the value of the computational resource is a bandwidth value and the measure of the computational resource is a measure of bandwidth.

3. The method of claim 2, wherein the applying the at least one rule comprises:
when it is determined to allow the communication session to be initiated at the bandwidth value, instructing the source endpoint to initiate the communication session based on the bandwidth value, and
when it is determined to not allow the communication session to be initiated at the bandwidth value, instructing the source endpoint to initiate the communication session based on an alternative bandwidth value.

4. The method of claim 2, wherein the applying the at least one rule comprises:
when it is determined to not allow the communication session to be initiated at the bandwidth value, calculating an alternate path for the communication session, wherein the alternate path includes sufficient bandwidth for initiating the communication session at the bandwidth value.

5. The method of claim 2 wherein prior to the determining the measure of bandwidth:
retrieving a plurality of routing information bases from a plurality of network elements in the network;
generating a topological map of the network based on the plurality of routing information bases; and
calculating the path for the communication session by searching the topological map of the network between the source endpoint and the destination endpoint.

6. The method of claim 2, wherein the determining the measure of the computational resource for the at least one network element in the path from the source endpoint to the destination endpoint comprises:
retrieving current measures of the computational resource from network elements located along the path from the source endpoint to the destination endpoint; and
selecting a lowest of the current measures of the computational resource as the measure of bandwidth for the at least one network element.

7. The method of claim 1, wherein conditioning the packets further comprises providing the packets access to a priority queue.

8. An application manager comprising:
a memory element storing electronic code; and
a processor coupled to the memory element and operable to execute the electronic code, wherein the processor, when executing the electronic code, performs operations comprising:
receiving a request associated with initiating a communication session in a network, the request identifying a source endpoint and a destination endpoint of the communication session and a value of a computational resource associated with the communication session;
determining a measure of the computational resource for at least one network element in a path from the source endpoint to the destination endpoint;
applying at least one rule to determine whether to allow the communication session to be initiated at the value, wherein the at least one rule identifies values;
identifying a priority value for the communication session based on a policy of the at least one network element;
marking packets in the communication session with the priority value retrieved from the policy of the at least one network element, the priority value being used by the at least one network element to reduce the probability of dropping the packets in the communication session relative to other packets that traverse the at least one network element;
generating, based on the at least one rule, an instruction to initiate the communication session; and
wherein the processor, when executing the electronic code, further performs operations during the communication session comprising:
determining the measure of the computational resource for each of a plurality of different classes of service for the at least one network element, the classes of service comprising a first priority value and a second priority value, wherein packets marked with the first priority value have a lower likelihood of being dropped by the at least one network element than packets marked with the second priority value;
determining that the at least one network element is using a majority of its capacity for the packets marked with the second priority value;
determining, from the policy of the at least one network element, that there is additional available capacity on the at least one network element for the packets marked with the first priority value; and
conditioning the packets in the communication session by identifying the priority value of the packets to be the first priority value so that the at least one network element uses at least a portion of the additional available capacity for the packets in the communication session.

9. The application manager of claim 8, wherein the value of the computational resource is a bandwidth value and the measure of the computational resource is a measure of bandwidth.

10. The application manager of claim 9, wherein the applying the at least one rule comprises:
when it is determined to allow the communication session to be initiated at the bandwidth value, instructing the source endpoint to initiate the communication session based on the bandwidth value, and
when it is determined to not allow the communication session to be initiated at the bandwidth value, instructing the source endpoint to initiate the communication session based on an alternative bandwidth value.

11. The application manager of claim 9, wherein the applying the at least one rule comprises:
when it is determined to not allow the communication session to be initiated at the bandwidth value, calculating an alternate path for the communication session, wherein the alternate path includes sufficient bandwidth for initiating the communication session at the bandwidth value.

12. The application manager of claim 9, wherein prior to the determining the measure of bandwidth:
retrieving a plurality of routing information bases from a plurality of network elements in the network;
generating a topological map of the network based on the plurality of routing information bases; and
calculating the path for the communication session by searching the topological map of the network between the source endpoint and the destination endpoint.

13. The application manager of claim 9, wherein the determining the measure of the computational resource for the at least one network element in the path from the source endpoint to the destination endpoint comprises:
retrieving current measures of the computational resource from network elements located along the path from the source endpoint to the destination endpoint; and selecting a lowest of the current measures of the computational resource as the measure of bandwidth for the at least one network element.

14. The application manager of claim 8, wherein conditioning the packets further comprises providing the packets access to a priority queue.

15. A computer-readable non-transitory medium comprising one or more instructions, that when executed on a processor configure the processor to perform one or more operations comprising:
   receiving a request associated with initiating a communication session in a network, the request identifying a source endpoint and a destination endpoint of the communication session and a value of a computational resource associated with the communication session;
   determining a measure of the computational resource for at least one network element in a path from the source endpoint to the destination endpoint;
   applying at least one rule to determine whether to allow the communication session to be initiated at the value, wherein the at least one rule identifies values;
   identifying a priority value for the communication session based on a policy of the at least one network element;
   marking packets in the communication session with the priority value retrieved from the policy of the at least one network element, the priority value being used by the at least one network element to reduce the probability of dropping the packets in the communication session relative to other packets that traverse the at least one network element;
   generating, based on the at least one rule, an instruction to initiate the communication session;
   during the communication session, the operations further comprising:
   determining the measure of the computational resource for each of a plurality of different classes of service for the at least one network element, the classes of service comprising a first priority value and a second priority value, wherein packets marked with the first priority value have a lower likelihood of being dropped by the at least one network element than packets marked with the second priority value;
   determining that the at least one network element is using a majority of its capacity for the packets marked with the second priority value;
   determining, from the policy of the at least one network element, that there is additional available capacity on the at least one network element for the packets marked with the first priority value; and
   conditioning the packets in the communication session by identifying the priority value of the packets to be the first priority value so that the at least one network element uses at least a portion of the additional available capacity for the packets in the communication session.

16. The computer-readable non-transitory medium of claim 15, wherein the value of the computational resource is a bandwidth value and the measure of the computational resource is a measure of bandwidth.

17. The computer-readable non-transitory medium of claim 16, wherein the applying the at least one rule comprises:
   when it is determined to allow the communication session to be initiated at the bandwidth value, instructing the source endpoint to initiate the communication session based on the bandwidth value, and
   when it is determined to not allow the communication session to be initiated at the bandwidth value, instructing the source endpoint to initiate the communication session based on an alternative bandwidth value.

18. The computer-readable non-transitory medium of claim 16, wherein the applying the at least one rule comprises:
   when it is determined to not allow the communication session to be initiated at the bandwidth value, calculating an alternate path for the communication session, wherein the alternate path includes sufficient bandwidth for initiating the communication session at the bandwidth value.

19. The computer-readable non-transitory medium of claim 15, wherein prior to the determining the measure of bandwidth:
   retrieving a plurality of routing information bases from a plurality of network elements in the network;
   generating a topological map of the network based on the plurality of routing information bases; and
   calculating the path for the communication session by searching the topological map of the network between the source endpoint and the destination endpoint.

20. The computer-readable non-transitory medium of claim 15, wherein the determining the measure of the computational resource for the at least one network element in the path from the source endpoint to the destination endpoint comprises:
   retrieving current measures of the computational resource from network elements located along the path from the source endpoint to the destination endpoint; and
   selecting a lowest of the current measures of the computational resource as the measure of bandwidth for the at least one network element.

21. The computer-readable non-transitory medium of claim 15, wherein conditioning the packets further comprises providing the packets access to a priority queue.

* * * * *